US011393148B2

(12) United States Patent
Zhu

(10) Patent No.: US 11,393,148 B2
(45) Date of Patent: Jul. 19, 2022

(54) AUTOMATIC WEIGHT DETERMINATION FOR UNASSIGNED VARIABLES

(71) Applicant: Microsoft Technology Licensing, LLC, Redmond, WA (US)

(72) Inventor: Xuelei Zhu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/721,420

(22) Filed: Dec. 19, 2019

(65) Prior Publication Data

US 2021/0192820 A1      Jun. 24, 2021

(51) Int. Cl.
| | |
|---|---|
| *G06T 13/00* | (2011.01) |
| *G06F 40/109* | (2020.01) |
| *G06F 40/18* | (2020.01) |
| *G06F 3/0482* | (2013.01) |

(52) U.S. Cl.
CPC ............ *G06T 13/00* (2013.01); *G06F 3/0482* (2013.01); *G06F 40/109* (2020.01); *G06F 40/18* (2020.01)

(58) Field of Classification Search
USPC ........................................................ 345/473
See application file for complete search history.

(56) References Cited

U.S. PATENT DOCUMENTS

| | | |
|---|---|---|
| 5,818,461 A | 10/1998 | Rouet et al. |
| 7,804,503 B2 | 9/2010 | Fernandez et al. |
| 2006/0055700 A1 | 3/2006 | Niles et al. |
| 2007/0115289 A1* | 5/2007 | Goldfarb ................. G06T 13/40 345/473 |
| 2014/0359430 A1* | 12/2014 | Jacob ...................... G06T 13/00 715/236 |
| 2018/0315230 A1* | 11/2018 | Black ...................... G06T 13/40 |
| 2019/0371037 A1 | 12/2019 | Xie |

FOREIGN PATENT DOCUMENTS

WO      2010107575 A2      9/2010

OTHER PUBLICATIONS

Kovar, L. Automated Methods for Data-Driven Synthesis of Realistic and Controllable Human Motion, University of Wisconsin-Madison, 2004. [online], [Retrieved on Nov. 4, 2020], Retrieved from the Internet: <URL: http://pages.cs.wisc.edu/~kovar/thesis/thesis_full.pdf> (Year: 2004).*

(Continued)

*Primary Examiner* — Gordon G Liu

(57) ABSTRACT

Aspects of the present disclosure relate to automatic weight calculation and determination of unassigned variables within an entity. More specifically, the present disclosure provides a display of automatically calculated weights for unassigned content mapped to an animation token in an animation set. For example, based on a user input of content without an assigned weight, the animation application may automatically calculate the unassigned weight (and any other unassigned weights for content mapped to an animation token). The automatically calculated unassigned weights may then be displayed without any additional user input along with an indication of automatic calculation.

20 Claims, 12 Drawing Sheets

(56) References Cited

OTHER PUBLICATIONS

"Babylon101", Retrieved from: https://web.archive.org/web/20180313213522/http:/doc.babylonjs.com:80/babylon101/animations, Mar. 13, 2018, 16 Pages.

"Key Time Editor clip weights", Retrieved from: https://knowledge.autodesk.com/support/maya/learn-explore/caas/CloudHelp/cloudhelp/2018/ENU/Maya-Animation/files/GUID-635E5295-8DB6-43CC-938A-45F61708A691-htm.html, Aug. 13, 2018, 10 Pages.

"MODO", https://learn.foundry.com/modo/content/help/pages/animation/weighting_tools.html. Retrieved Date: Apr. 22, 2019, 8 Pages.

"Unity: Animation Layers", Retrieved from: https://web.archive.org/web/20150419065342/http:/docs.unity3d.com/Manual/AnimationLayers.html, Apr. 19, 2015, 3 Pages.

"International Search Report and Written Opinion Issued in PCT Application No. PCT/US2020/060322", dated May 28, 2021, 13 Pages.

* cited by examiner

AUTOMATIC WEIGHT DETERMINATION FOR UNASSIGNED VARIABLES

BACKGROUND

A variety of applications require users to expressly indicate that the application should perform an automatic calculation. However, there are many instances when the calculation should be implied without any express indication by the user. Additionally, when a user does expressly indicate that a calculation should be performed, the user's own indication often interferes with a display of the underlying, performed calculation. In some situations, the application displays the user indication to perform a calculation rather than the calculation itself. In other situations, there may be no displayed indication that a value is, or will be, calculated.

It is with respect to these and other general considerations that examples have been described. Also, although relatively specific problems have been discussed, it should be understood that the examples should not be limited to solving the specific problems identified in the background.

SUMMARY

Aspects of the present disclosure relate to automatic weight calculation and determination of unassigned variables. Specifically, the present disclosure teaches systems and methods for calculating or determining a weight for an unassigned variable based on weights assigned to other, related variables.

Automatic weight calculation and determination of unassigned variables may be utilized by a variety of applications. An animation application may load an animation set that includes a set of content mapped to an animation token. The animation set may have one or more pieces of content associated with an existing animation token and may have one or more animation tokens associated with the animation set. There may be a set of weights corresponding with the set of content, with one weight of the set of weights associated with one piece of content in the set of content.

A user input may be received that is associated with a specified animation token. The user input may indicate a variety of actions, such as a new animation token to be added to the animation set, a new piece of content to be added to the set of content mapped to the existing animation token, a weight assignment for a specified weight of the set of weights corresponding to the content mapped to the existing animation token, or any other user input associated with the existing animation token or a new animation token in the animation set.

If the set of weights has a set of unassigned weights, then the animation application may automatically calculate the set of unassigned weights based on a distribution and, potentially, other assigned weights. The automatically calculated unassigned weights may then be displayed. Additionally, there may be an indication of which weights in the set of weights were automatically calculated.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The accompanying figures illustrate one or more aspects of the disclosed methods and systems for automatic weight calculation and determination of unassigned variables within an entity. In the appended figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label. Non-limiting and non-exhaustive examples are described with reference to the following figures.

Figure 1:
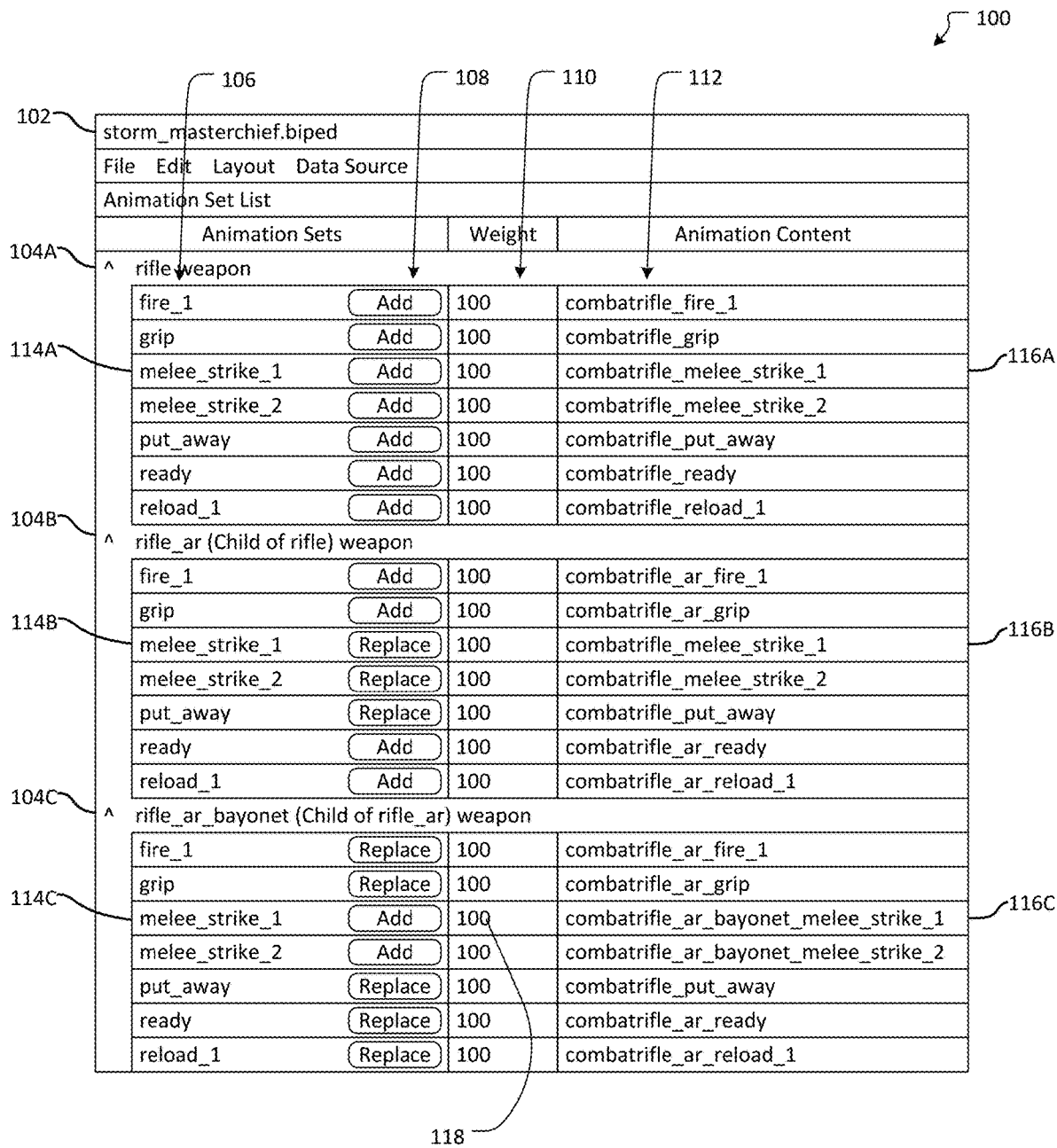
FIG. 1 illustrates an animation application with one-to-one mapping of content to animation tokens which are part of animation sets for an entity.

While examples of the disclosure are amenable to various modifications and alternative forms, specific examples have been shown by way of example in the drawings and are described in detail below. The intention is not to limit the scope of the disclosure to the particular examples described. On the contrary, the disclosure is intended to cover all modifications, equivalents, and alternatives falling within the scope of the disclosure and the appended claims.

DETAILED DESCRIPTION

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entire software implementation, or an implementation combining software and hardware aspects. The following detailed description is, therefore, not to be interpreted in a limiting sense.

Accordingly, the present disclosure provides systems and methods for automatic weight calculation and determination of unassigned variables and hidden formulas. In an example, the present disclosure provides methods and systems for automatically calculating unassigned weights associated with content mapped to an animation token in an animation set.

Animators can assign multiple pieces of animation content to an animation token and set a weight for each piece of content. For example, if there are two different "Dance" animations, "happydance" weight 30% and "goofydance" weight 70%, the resulting animation may pick which animation one to play according to the weight when calling a "Dance" animation, or may otherwise combine the animations according to their respective weights, or any other selection or combination of the weighted animations.

When there is more than one piece of content assigned to one animation token (e.g., continuing the example above, "Dance"), the weight assigned to each animation may be split according to a distribution (e.g., an equal distribution), or a user may set or assign a weight to one or more pieces of content assigned to the animation token, leaving some of the pieces of content with unassigned weights. The present disclosure allows users see automatic weight calculations for animations with unassigned weights. As used herein, an unassigned weight refers to any animation (or cell, formula, or any other piece of content, depending upon the type of application) which does not have an explicitly assigned weight value.

Other ways to input a weight may require users to either assign a weight, or type in a placeholder, such as a "1", in order to automatically calculate any unassigned weights. There are at least two issues: (1) a large amount of manual work is required to type in a value into each weight for each piece of content (either an assigned value or "1" for automatic calculation), and (2) the use of "1" to represent "automatic" calculation is confusing, hiding the calculated value while also indicating a "1" which, in other contexts, is associated with 100% even though the calculated weight may be less than 100%. By providing an automatic calculation and display of weights for any unassigned weights, the present disclosure drastically improves productivity and efficiency of content-creating.

As a further example, a single animation application could have a plurality of mapped or associated content. The animation token may be relisted for each piece of mapped content. Additionally or alternatively, the animation token may be depicted in any other way to show mapping or association of each piece of content to the single animation token. Each piece of content associated with the single animation token may have a weight associated with each respective piece of content. For example, there may be three pieces of content, with three associated weights, mapped to a single animation token. Using the weight placeholder of "1," as described above, each of the three weights may have a user-assigned weight of "1." Additionally, as described above, a user-assigned weight of "1" may indicate that an animation application hosting the animation token may automatically calculate the weights associated with the set of content of the single animation token. The automatically calculated weight associated with a weight assigned a placeholder of "1" could be calculated in a variety of ways. For example, if there was only one piece of content associated with the single animation token, then the weight of "1" may be automatically calculated as 100. If there is more than one piece of content associated with the single animation token, then each weight associated with each piece of content may be calculated using any default or preset distribution or any other distribution which may be selected by the user or may not require user selection. For example, each of the weights may be calculated using an equal distribution such that a percent available out of 100% is divided equally among the weights of the pieces of content assigned to the single animation token (e.g., in the example of three pieces of content, each of the three associated weights may be calculated to be 33.33%). Alternatively, any other distribution or calculation may be used to determine a weight associated with a user-assigned weight of "1."

As described above, a problem with a user-indication of "1" is that "1" may imply 100% in an instance where percentages are calculated between 0-1 (e.g., 0% to 100%). However, if there were three pieces of content associated with a single animation token, each being assigned a weight of "1" (indicating automatic calculation), then an assumption that 1 is 100% would result in >100% of content associated with a single animation token. However, even if a different value is calculated for the weights, they still appear as the user-inputted placeholder of "1" (to indicate automatic calculation), even though the hidden or implied value of the weight is different than 100%. As a further example, although the calculation of the weights may not be 100%, any weight that has been assigned as "1" will appear as "1," instead of the underlying, associated calculated weight, as automatically calculated by the animation application. Some of the examples disclosed herein may address this problem.

Additionally, or alternatively, aspects disclosed herein may also be applicable to spreadsheet applications. For example, if a formula in a spreadsheet application references values that have not yet been assigned, the value for the formula may not appear, or may present an error. By showing the automatic calculation for the formula (e.g., the actual formula associated with the cell), a spreadsheet user's efficiency and productivity may increase by allowing easier and faster troubleshooting for the hidden formula, without clicking into the cell or performing a separate a calculation themselves.

As used herein, a computing device may be any of a variety of devices, including, but not limited to, a mobile computing device, a tablet computing device, a desktop or laptop computing device, an Internet of Things (IoT) computing device, a server computing device, or a distributed computing device (e.g., which may be comprised of a plurality of computing devices). An API provided by or made available by the computing device may enable a set of software instructions to engage in file system access or searching, network communication, process management, memory management, or communication with a specific hardware component (e.g., device drivers, sensor data access, etc.), among other functionalities. While the term API is used, it will be appreciated than an API may comprise any of a wide variety of software interfaces, commands, libraries, or services, among others, useable by a set of software instructions when executed by a computing device.

As used herein, "software," "software instructions," and a "set of software instructions" may be used interchangeably. Example software may include applications, plugins, scripts, modules, drivers, and/or web applications, among other examples. In some examples, software may be pre-compiled, compiled at runtime, or interpreted at runtime. In another example, software may execute in kernel mode, user mode, or a combination thereof.

Although aspects of the present disclosure are described herein with respect to animation variables and related cells in spreadsheet applications, one of skill in the art will appreciated that this disclosed aspects may apply to other types of applications that have values that may be hidden or not easily discovered. Additionally or alternatively, aspects of the present disclosure may relate to gaming systems, augmented reality ("AR"), virtual reality ("VR"), or any other application.

FIG. 1 illustrates an animation application 100 with one-to-one mapping of content 112 to animation tokens 106, which are part of animation sets 104A, 104B, 104C for an entity 102. As used herein, an entity may refer to an object that may perform a number of different animations (e.g., a character, a vehicle, etc.). The animation application 100 may be hosted locally or on a cloud server, on one or more devices. As shown, the entity 102 (e.g., "storm_masterchief.biped") may have a variety of animation sets. In certain aspects, the animation sets may be hierarchical, such that one animation set may inherit characteristics from another animation set. For example, FIG. 1 depicts a grandparent animation set 104A (e.g., "rifle"), a parent animation set 104B (e.g., "rifle_ar"), a child animation set 104C (e.g., "rifle_ar_bayonet"). It should be appreciated that the entity 102 may include any other animation sets related or unrelated to the shown animation sets 104A, 104B, 104C.

The animation sets 104A, 104B, 104C may have a variety of components, such as animation tokens 106, control 108, content weights 110, content 112, or any other information, content, or icons related to the animation sets 104A, 104B, 104C. Each piece of content 112 may have an associated content weight 110 and control 108. The content 112, weights 110, and control 108 may be mapped to an animation token 106 which may be part of an animation set 104A, 104B, 104C for the entity 102, loaded in the animation application 100. As a further example, animation tokens 106 may have a set of content 112 mapped to each animation token 106, the set of content 112 may be associated with a respective set of weights 110 corresponding with each content 112 in the set of content 112.

The animation tokens 106 may represent a naming mechanism for content 112 or a set of content 112 associated with an animation sets 104A, 104B, and/or 104C. The control 108 may be a selectable control that indicate a change to an associated animation token 106 or content 112. For example, receiving input via a selection of the control 108 may provide functionality to add a new animation token 106 to the animation set 104A, 104B, and/or 104C, add new content 112 to the set of content 112 associated with the animation token 106, replace existing content 112 of the set of content 112 associated with the animation token, and/or any other additions, updates, or changes to content 112 or animation tokens 106 within the animation set 104A, 104B, 104C.

Content weights 110 may indicate a weight associated with each content 112 in a set of content 112 mapped to an animation token 106. In aspects, the weight may determine how often the associated animation is performed or how multiple pieces of content are combined. In the depicted example, there is one-to-one mapping of content 112 with animation tokens 106 and thus each weight is 100 to indicate that each animation token 106 is 100% of the content 112. As described herein, a weight 110 with a value of "100" may also be selected by a user to indicate that the animation application 100 may automatically calculate the weight 110 of the content 112 associated with an animation token 106 (see FIG. 1 at animation token set of content weights 118). In an example where a plurality of content 112 is mapped to an animation token 106, the total set of weights 110 associated with the plurality of content 112 adds up to 100% to be mapped to the animation token 106.

The content 112 may be any type of content that can be associated with the entity 102, including an animation file, image file, sound file, a movie, code, translation, AR content, VR content, gaming content, or any other content that may be mapped to an animation token 106 as part of an animation set 104A, 104B, 104C.

As further clarification, the animation set 104A (e.g., "rifle") may have a animation token 114A (e.g., "melee_strike_1") with content 116A (e.g., "combatrifle_melee_strike_1") mapped to the animation token 114A. The content control 108 associated with animation token 114A is indicated as an "Add" button that may allow a user to add a new animation token (e.g., add an animation token with a name different than animation token 114A), add new content mapped to animation token 114A (e.g., add a content file different than content 116A), or change the content 116A.

In this example, the animation set 104B (e.g., "rifle_ar") may be a child of animation set 104A, which may indicate that animation set 104B has animation tokens 106 that depend or inherit from animation tokens 106 in animation set 104A (e.g., in this example, animation set 104B has the following animation tokens 106 that inherit from animation tokens 106 in animation set 104A: "melee_strike_1," "melee_strike_2," and "put_away"). As illustrated in this example, animation token 114B is the same animation token 106 as animation token 114A. In this example, the content 116B of animation token 114B is the same as content 116A of animation token 114A. In this instance, where an animation token 106 of animation set 104B is a child of animation token 114A, the control 108 associated with the animation token 114B may be a "Replace" control. The "Replace" control may allow a user to sever the child relationship with an animation token (e.g., sever the relationship between animation token 114B and animation token 114A) by adding new content mapped to animation token 114B (e.g., add a content file different than content 116B), or change the content 116B. As an example, after the parent-child relationship is severed, the control 108 may change to the "Add" button described above (e.g., as shown with animation token 114C).

As a further example where the animation set 104C (e.g., "rifle_ar_bayonet") is a child of animation set 104B, which may indicate that animation set 104C has animation tokens 106 that depend or inherit from animation tokens 106 in the animation set 104B (e.g., in this example, animation set 104C has the following animation tokens 106 that inherit from animation tokens 106 in animation set 104B and have associated control "Replace:" "fire_1," "grip," "put_away," "ready," and "reload_1"). As illustrated in this example, animation token 114C may have a name that is identical to animation token 114A and animation token 114B, but does not inherit from animation token 114B, i.e., as the content 116C that is mapped to animation token 114C is different from content 116B and content 116A (e.g., content 116C "combatrifle_ar_bayonet_melee_strike_1" is different from content 116A and content 116B "combatrifle_melee_strike_1"). Because the animation token 114C, as illustrated, is not part of a parent-child relationship, the associated control 108 is an "Add" button, as described above. As a further example, the set of content 116C (e.g., "combatrifle_ar_bayonet_melee_strike_1") may have an associated set of content weights 118 (e.g., a weight of "100" associated with "combatrifle_ar_bayonet_melee_strike_1"). In this example, there is one-to-one mapping of content 116C with animation token 114C and thus there is one weight 110 in the set of child content weights 118 associated with the content 116C.

Figure 2:
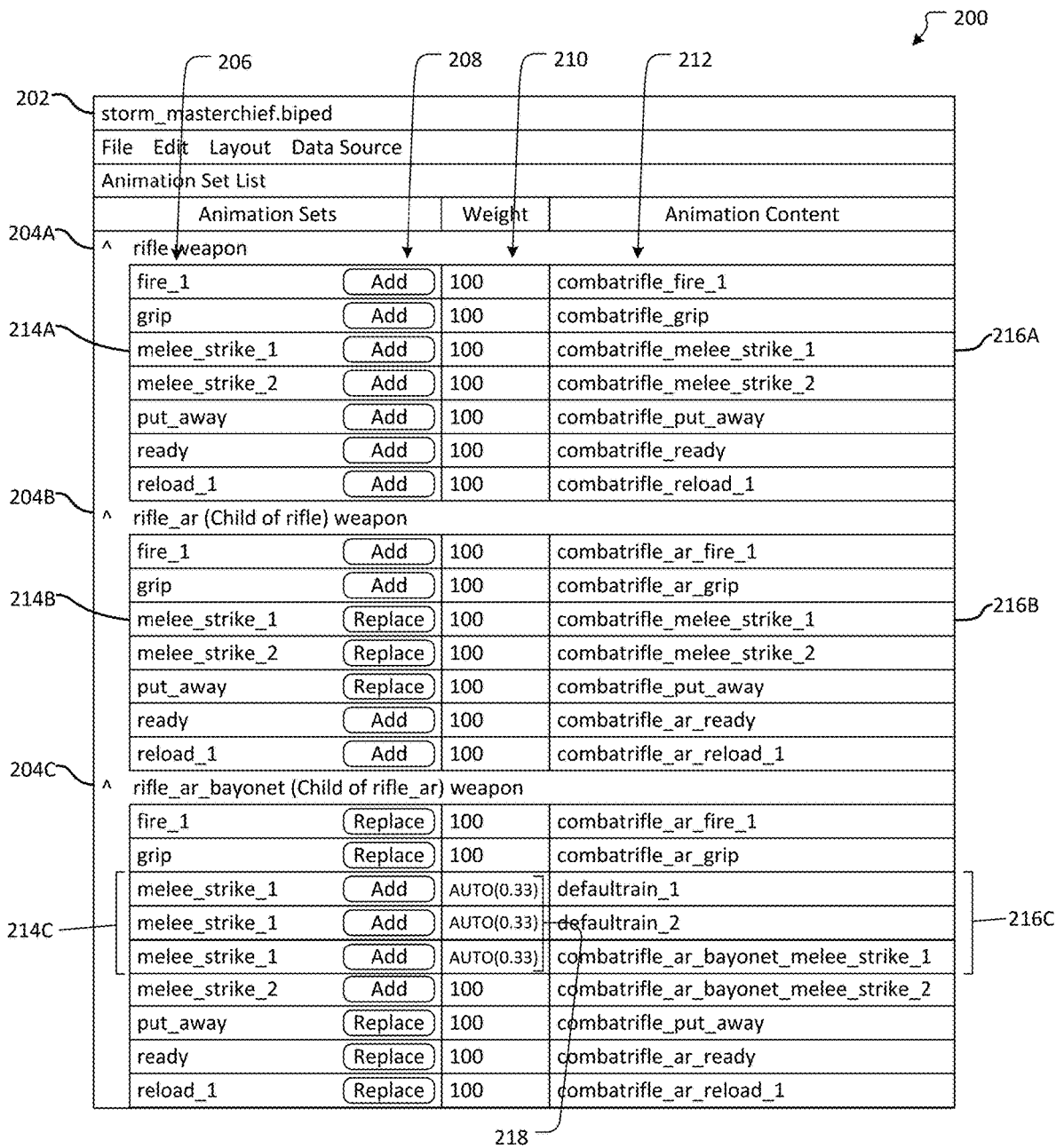
FIG. 2 illustrates an animation application adapted from FIG. 1 with an automatically calculated and displayed set of content weights associated with content mapped to an animation token which is part of an animation set for an entity.

FIG. 2 illustrates an exemplary animation application 200 with an automatically calculated and displayed set of content auto weights 218 associated with content 216C mapped to an animation token 214C, which is part of an animation set 204C for an entity 202. Other than the illustration of the set of content auto weights 218, animation application 200 may have similar features to that of animation application 100. For example, animation application 200 may have an entity 202 with a grandparent animation set 204A, parent animation set 204B, and child animation set 204C. The animation sets 204A, 204B, 204C may have a variety of components, including animation tokens 206, control 208, content weights 210, and content 212. As a further example, animation set 204A may have an animation token 214A with mapped content 216A and a control 208 and content weight 210 associated with the content 216A. As another example, animation set 204B may have an animation token 214B with mapped content 216B and a control 208 and content weight 210 associated with the content 216B. As another example, animation set 204C may have an animation token 214C with mapped content 216C and a control 208 and set of content auto weights 218 associated with the content 216C. The relationships between the animation sets 204A, 204B, 204C and their components may be the same or similar to the relationships described in FIG. 1 with respect to animation sets 104A, 104B, and 104C.

In this illustration, an animation token 214C (e.g., "melee_strike_1") may have a plurality of content 212 mapped to the animation token 214C as content 216C. In this example, content 216C is illustrated as "defaultrain_1," "defaultrain_2," and "combatrifle_ar_bayonet_melee_strike_1" which is mapped to animation token 214C "melee_strike_1"). The content 216C may have an associated set of content auto weights 218 associated with each respective content 212 of content 216C mapped to animation token 214C. In this example, content 216C is a set of three pieces of content 212 mapped to animation token 214C (e.g., "defaultrain_1," "defaultrain_2," and "combatrifle_ar_bayonet_melee_strike_1"). Thus, because this example uses three pieces of content 212 in the set of content 216C, there are three weights 210 in the set of content weights 218 associated with the content 216C (e.g., one weight for each content 212 in the set of content 216C).

FIG. 2 further illustrates the weights 210 for the set of content auto weights 218 as the automatically calculated weights 210. These automatically calculated weights may or may not need a prior user indication of automatic calculation. For example, the weights 210 associated with each piece of content 212 may be automatically calculated without any user assignment (e.g., a user need not enter a weight of "100" to indicate that the animation application 200 should automatically calculate a weight 210 associated with each piece of content 212). Although FIG. 2 depicts only weights 218 associated with content 216C as being automatically calculated, it should be appreciated that any number of weights 210 in entity 202 may be assigned (e.g., a user assigns a value to the weight, for example "100" for each weight 210 assigned to each piece of content 216A) or automatically calculated (e.g., when a weight has no assigned user input, for example the content auto weight 218). In this example, as a user adds new content 212 to the content 216C, without specifying an associated weight, the weights 210 of each content 212 of the set of content 216C may be automatically calculated and displayed. In this example, the automatic calculation of weights 210 associated with the set of content 216C may be calculated using an equal distribution (e.g., three unassigned weights 210 associated with an animation token 214C may equally divide 100% into three, equal weights, thus displaying an automatically calculated weight of 0.33, or 33%). It should be appreciated that any other default, preset, or specified distribution may be used to automatically calculate weights 210, other than an equal distribution (which may result in calculated weights being different than 0.33 or non-identical weights for each weight 210 in the set of content weights 218 for the animation token 214C).

An indication of automatic weight calculation may be displayed with the weights 210. For example, each weight 210 illustrated in the set of content weights 218 may have an "AUTO" indication adjacent to, or associated with, the automatically calculated weight to show that the weight 210 was automatically calculated without any user assignment to each automatically calculated weight. Alternatively, an indication of automatic calculation may be indicated via variations in visual appearance of the weight, such as highlighting, bolding, italicizing, graying out, or any other visual indication that the weight 210 was automatically calculated, and not assigned by a user (e.g., the automatic calculation of weight may apply to unassigned weights that have not required a user assignment or indication of calculation).

Figure 3:
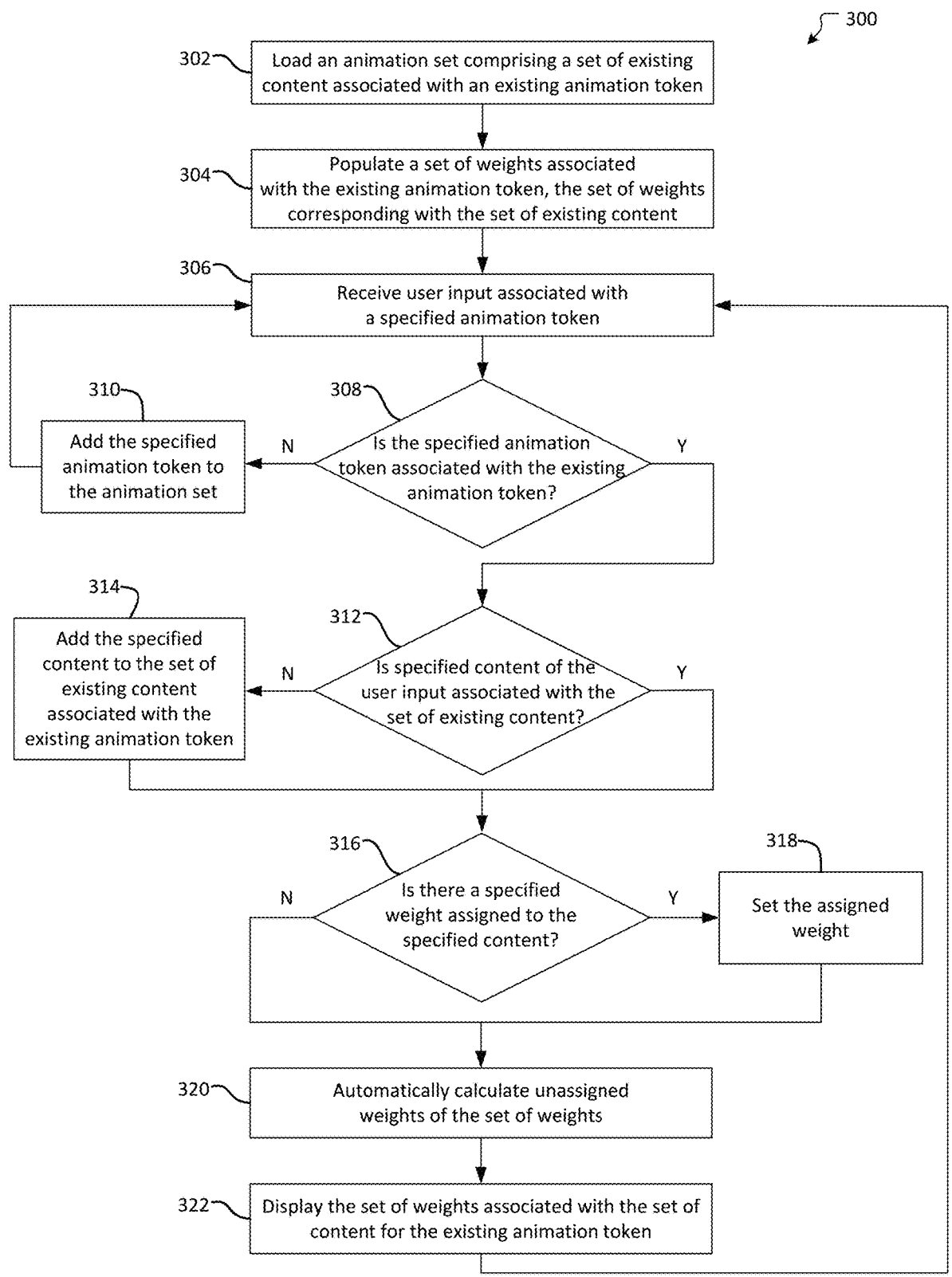
FIG. 3 illustrates a method of automatic weight calculation and determination of unassigned variables within an entity.

FIG. 3 illustrates a method 300 of automatic weight calculation and determination of unassigned variables within an entity (e.g., entity 200 shown in FIG. 2). Method 300 begins at operation 302 wherein an animation application (e.g., animation application 200) loads an animation set (e.g., animation set 204C) comprising a set of content (e.g., set of content 216C) associated with an existing animation token (e.g., animation token 214C). The animation set may have one or more pieces of content associated with an existing animation token, and may have one or more animation tokens associated with the animation set. There may be one or more animation sets (e.g., animation sets 204A, 204B, 204C).

Method 300 then moves to operation 304 where the animation application populates a set of weights (e.g., a set of content weights 218) associated with the existing animation token, the set of weights corresponding with the set of content. For example, if the set of content has one piece of content, then the corresponding set of weights may have one weight. As a further example, if set of content that is mapped to an animation token has x pieces of content, then the corresponding set of weights may have x weights, each weight of the set of weights associated with a respective piece of content of the set of content. Thus, a weight may correspond to each piece of content mapped to an animation token. The set of weights may be populated based on default, preset, or specified distributions, explicitly set by a user, or based on previously determined weights set or calculated in a previous instance the animation set was loaded. Additionally or alternatively, the weights may be populated by any other means of assigning a weight to each piece of content in the set of content via a corresponding set of weights.

After the set of weights is populated, the method 300 continues to operation 306 where the animation application receives a user input associated with a specified animation token. The user input may be a variety of inputs. For example, the user input may be a new animation token to be added to the animation set, a new piece of content to be added to the set of content mapped to the existing animation token, a weight assignment for a specified weight of the set of weights corresponding to the set of content mapped to the existing animation token, or any other user input associated with the existing animation token or a new animation token in the animation set.

At operation 308, the animation application asks if the specified animation token received via the user input is the same as the existing animation token. If the specified animation token is not the same as the existing animation token already present in the animation set (e.g., if the user input at operation 306 was adding a new animation token to the animation set), then the operation 308 evaluates to "No" and method 300 proceeds to operation 310 where the animation application adds the specified animation token to the animation set. After operation 310, the method 300 may repeat operation 306 to determine if another user input is received. For example, if the user input at original operation 306 was adding a new animation token to the animation set that was different from an existing animation token in the animation set, then at repeated operation 306, the method 300 may receive a user input associated with the new animation token added at original operation 306 (e.g., a new piece of content to be added to the set of content mapped to the new animation token, or a weight assignment for a specified weight of the set of weights corresponding to the set of content mapped to the new animation token) that may cause operation 308 to result in a "Yes" determination to flow to operation 312. As a further example, this flow of operations (e.g., 306 to 308 to 310 to 306 to 308 to 312) may occur after a new animation token is added to the animation set (which may be evaluated as the existing animation token upon repeat of operation 306 and 308) followed by a user input associated with the new animation token already added to the animation set.

If operation 308 is evaluated to "Yes," then method 300 proceeds to operation 312 where the method 300 determines if specified content of the user input is associated with the set of existing content. If the specified content (received as user input at operation 306) is not associated with the set of existing content (e.g., the user input is a new piece of content to be added to or replaced in the set of existing content mapped to the existing animation token, and operation 312 evaluates to "No"), then the method proceeds to operation 314 where the animation application adds the specified content to the set of existing content associated with the existing animation token (e.g., a piece of new content is added to the set of existing content). After operation 314, the method proceeds to operation 316. If operation 312 is evaluated to "Yes," then the method 300 proceeds directly to operation 316. Operation 312 may be evaluated to "Yes" when the specified content of the user input is associated with a piece of content in the set of existing content (e.g., a weight assignment for a specified weight of the set of weights corresponding to the set of content mapped to the existing animation token).

At operation 316 the method 300 evaluates if there is a specified weight that is assigned to the specified content. For example, operation 316 is evaluating if the user input received at operation 306 is an assigned weight or specified weight in the set of weights associated with the specified content mapped to the specified animation token. If operation 316 evaluates to "No," then flow proceeds directly to operation 320. If operation 316 evaluates to "Yes," then flow proceeds to operation 318 where the animation application sets the assigned weight received via user input at operation 306.

After determining if there are weights assigned via the user input at operation 316, the method flows to operation 320 where the animation application automatically calculates unassigned weights of the set of weights. Assigned weights of the set of weights may be weights in the set of weights that have received a specified user input (e.g., the user input received at operation 306, or any other prior assignment of weight specific to a piece of content in the set of existing content which may now be updated with specified content after operation 314). Unassigned weights of the set of weights are any remaining weights that were not previously or currently assigned. Assigned weights may maintain their assigned or set value while automatic calculation of unassigned weights may proceed for unassigned weights in the set of weights. This automatic calculation may be evaluated in a method similar to method 400 described herein with respect to FIG. 4.

Method 300 may then proceed to operation 322 where the animation application may display the set of weights associated with the set of existing content for the existing animation token. For example, the assigned weights may be displayed with their assigned or set value, and the unassigned weights may be displayed with their automatically calculated value (e.g., which may be determined at operation 320). There may be an indication of which weights in the set of weights are automatically calculated. For example, the automatically calculated weights or unassigned weights may have an indications such as, "AUTO" text adjacent to, or associated with, the automatically calculated weight, highlighting, bolding, italicizing, graying out, or any other visual indication that the weight 210 was automatically calculated, and not an assigned weight.

Method 300 may repeat operations 306-320 for different received user inputs associated with a specified animation token. As an example, the repeated user input may be a new animation token to be added to the animation set, a new piece of content to be added to the set of content mapped to the existing animation token, a weight assignment for a specified weight of the set of weights corresponding to the set of content mapped to the existing animation token, or any other user input associated with the existing animation token or a new animation token in the animation set.

Figure 4:
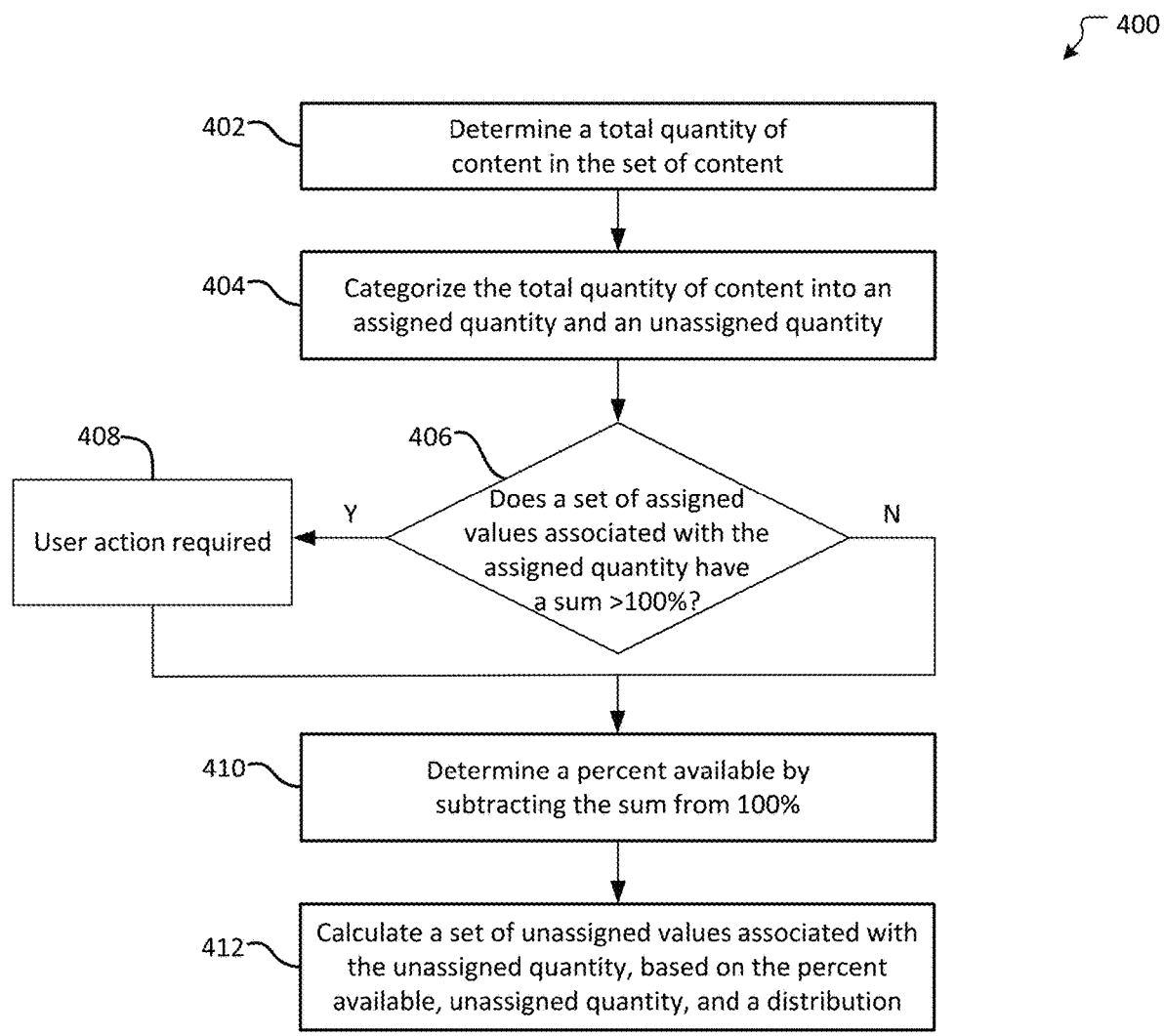
FIG. 4 illustrates a method of automatically calculating unassigned weights of a set of weights.

FIG. 4 illustrates a method 400 of automatically calculating unassigned weights of a set of weights. Method 400 begins at operation 402 where the animation application determines a total quantity of content in the set of content (e.g., the set of existing content described throughout method 300). The total quantity of content is the number of piece of content contained in the set of content mapped to an animation token. For example, if the set of content was content 216C illustrated in FIG. 2, then the total quantity of content in the set of content would be three (e.g., the content in the set of content 216C are (1) "defaultrain_1," (2) "defaultrain_2," and (3) "combatrifle_ar_bayonet_melee_strike_1"). As another example, if the set of content was content 216B illustrated in FIG. 2, then the total quantity of content in the set of content would be one (e.g., the content in the set of content 216C is (1) "combatrifle_melee_strike_1").

After operation 402, method 400 continues to operation 404 where the animation application categorizes the total quantity of content into an assigned quantity and an unassigned quantity. The assigned quantity may refer to a quantity of content that has associated assigned weights. Assigned weights may be any assigned or set weight, specified by a user or an application, associated with a piece of content in the set of content, as described above. The unassigned quantity may refer to a quantity of content that is not currently assigned a weight. As an example, the unassigned quantity may reflect the difference between the total quantity of content and the assigned quantity (i.e., the quantity of content remaining after categorizing the assigned quantity).

At operation 406, the animation application evaluates if a set of assigned values associated with the assigned quantity have a sum >100%. For example, if the total quantity was three with assigned values 0.5, 0.6, and one unassigned value, the sum of the assigned values would equal 110% which is greater than 100%. If the sum is greater than 100%, then operation 406 evaluates to "Yes" and the method 400 proceeds to operation 408 where a user action is required to change the assigned values until the sum is less than or equal to 100%. For example, the animation application may display an error message indicating that the sum is >100% and require the user to take action change the sum. Additionally or alternatively, the animation application may provide suggested actions for the user to select from to make the sum less than or equal to 100%, such as maintaining a ratio of the assigned values with respect to suggested values, suggesting a movement in the decimal of the assigned values, determining a default, preset, or specified distribution for suggested values, using an assigned ratio for a different set of content with assigned values, or any other suggestion that may result in the sum being less than or equal to 100%. After operation 408, the method 400 continues to operation 410.

If operation 406 evaluates to "No," when the sum is less than or equal to 100%, then the method proceeds directly to operation 410 where the animation application determines a percent available by subtracting the sum from 100%.

After the percent available is determined, the method continues to operation 412 where the animation application calculates a set of unassigned values associated with the unassigned quantity, based on the percent available, unassigned quantity, and a distribution. The distribution may be any default, preset, specified, or currently selected distribution to distribute the percent available among the unassigned quantity of the set of content. For example, an equal distribution may equally divide the percent available equally among the unassigned quantity such that each unassigned weight associated with the set of content has an equal value. As another example, the distribution may mimic a ratio of the assigned values. For example, if the set of content has assigned values 0.2 and 0.4 with two unassigned values, then the ratio of assigned values is be 1:2 and a distribution for the unassigned quantity may be 0.13 and 0.27 (i.e., dividing the remaining percent of 0.4 into a 1:2 ratio). While specific examples of distributions and amount of assigned values and amount of unassigned values have been exemplified, it should be appreciated that any other type of distribution may be used to distribute the percent available among any number of unassigned quantities to associate automatically calculated values to unassigned content of the set of content.

Figure 5:
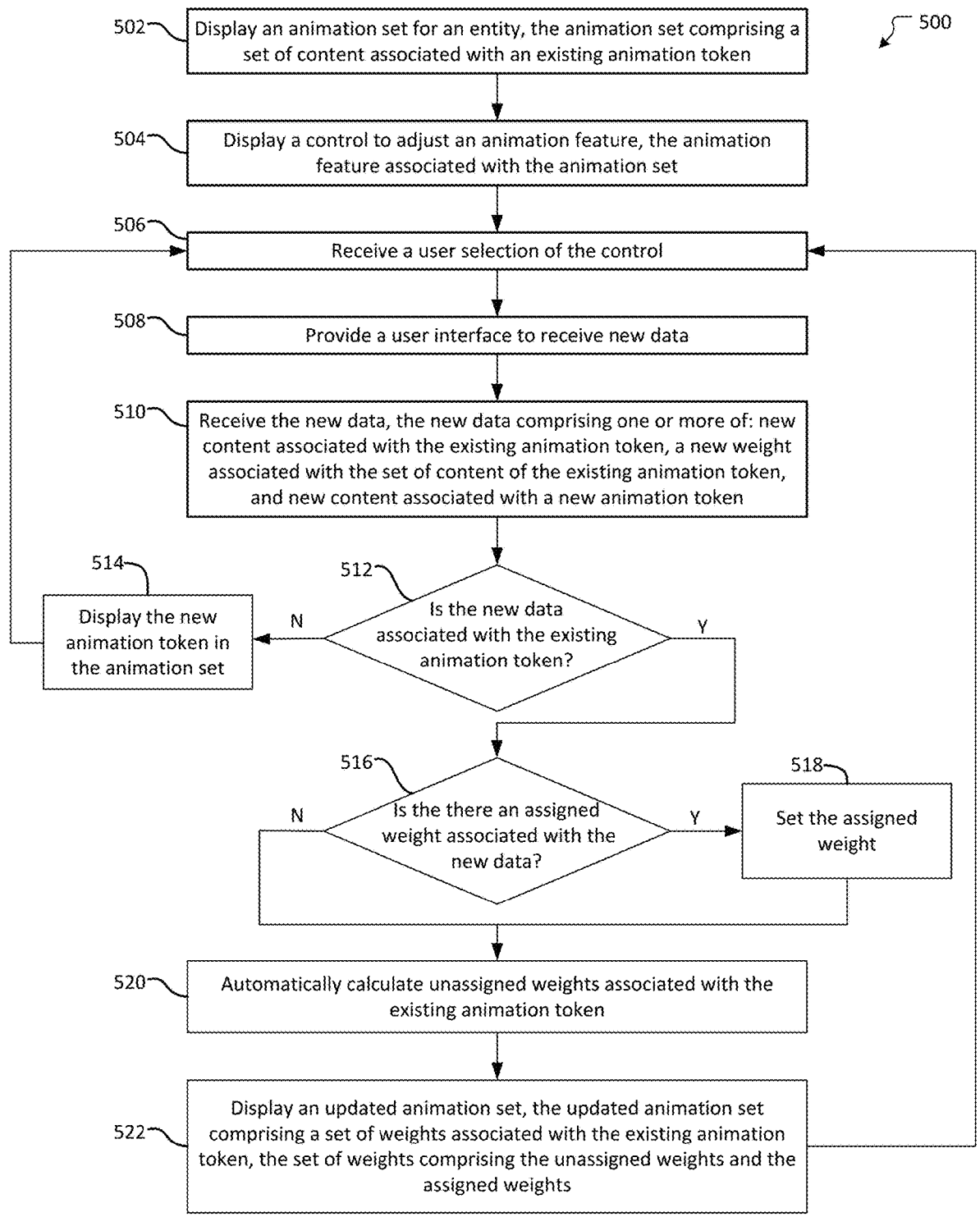
FIG. 5 illustrates a method of displaying automatic weight calculation and determination of unassigned variables within an entity on a user interface.

FIG. 5 illustrates a method 500 of displaying automatic weight calculation and determination of unassigned variables within an entity on a user interface. Method 500 begins at operation 502 where the animation application (e.g., animation application 200) displays an animation set for an entity, the animation set comprising a set of content associated with an existing animation token. The animation set for the entity may be displayed using operations similar to operations 302-304 in FIG. 3. For example, the animation application may load the animation set (e.g., animation set 204C) comprising a set of content (e.g., set of content 216C) associated with an existing animation token (e.g., animation token 214C). The animation set may have one or more pieces of content associated with an existing animation token, and may have one or more animation tokens associated with the animation set. There may be one or more animation sets (e.g., animation sets 204A, 204B, 204C). Additionally, the animation application may populate a set of weights (e.g., a set of content weights 218) associated with the existing animation token, the set of weights corresponding with the set of content. A weight may correspond to each piece of content mapped to an animation token. The set of weights may be populated based on default, preset, or specified distributions, or based on previously determined weights set or calculated in a previous instance the animation set was loaded. Additionally or alternatively, the weights may be populated by any other means of assigning a weight to each piece of content in the set of content via a corresponding set of weights. Thus, the animation application may display the animation set for the entity by loading and populating the animation set.

At operation 504, the animation application may display a control to adjust an animation feature, the animation feature associated with the animation set. As an example, a control (e.g., control 208) may be displayed in association with the animation set. An animation feature may be any feature associated with the animation set, such as an existing animation token, an existing weight, an existing content, any new token, or content, or any other feature associated with the animation set.

The method 500 continues to operation 506 where the animation application receives a user selection of the control. Upon selection of the control, the method 500 continues to operation 508 where the animation application provides a user interface to receive new data. The user interface may be general or specific to the user selection. For example, if only one type of control exists, then the user interface may be general to acquiesce a variety of user new data. As another example, the control may be specific to certain new data and may present unique user interfaces for the user to provide the new data. At operation 510, the animation application may receive the new data from the user via the user interface provided in response to selecting the control. As described herein, some examples of new data include new content associated with the existing animation token, a new weight associated with the set of content of the existing animation token, and new content associated with a new animation token.

At operation 512, the animation application determines if the new data is associated with the existing animation token. This determination may be the same or similar to operation 308 in FIG. 3. For example, if the specified animation token is not the same as the existing animation token already present in the animation set (e.g., if the new data received at operation 510 was adding a new animation token to the animation set), then the operation 512 evaluates to "No" and method 500 proceeds to operation 514 where the animation application displays the new animation token in the animation set. After operation 514, the method 500 may repeat operations 506-512 to receive a user selection of the control, provide a user interface to receive new data, receive new data, and re-determine if the new data is associated with the existing animation token. For example, if the new data at original operation 510 is adding a new animation token to the animation set that is different from an existing animation token in the animation set, then at repeated operation 510, the method 500 may receive a user input associated with the new animation token added at original operation 510 (e.g., a new piece of content to be added to the set of content mapped to the new animation token, or a weight assignment for a specified weight of the set of weights corresponding to the set of content mapped to the new animation token) that may cause operation 512 to result in a "Yes" determination to flow to operation 312. As a further example, this flow of operations (e.g., 512 to 514 to 506 to 508 to 510 to 512 to 516) may occur after a new animation token is added to the animation set (which may be evaluated as the existing animation token upon repeat of operation 510 and 312) followed by a user input associated with the new animation token already added to the animation set.

If operation 512 is evaluated to "Yes," then method 500 proceeds to operation 516 where the animation application determines if there is an assigned weight associated with the new data. For example, operation 512 may determine if the new data specifies an assigned weight associated with either an existing or new content associated with an existing animation token. If operation 516 evaluates to "No," then method 500 proceeds directly to operation 520. If operation 516 evaluates to "Yes," then method 500 proceeds to operation 518 before continuing to operation 520. At operation 518, the animation application sets the assigned weight, as used to determine the evaluation of operation 516.

At operation 520, the animation application may automatically calculate unassigned weights associated with the existing animation token. This operation 520 may be the same or similar to operation 320 described in FIG. 3. For example, assigned weights may be received via new data received from the user at operation 510. Unassigned weights may be any remaining weights that were not previously or currently assigned. Assigned weights may maintain their assigned or set value while automatic calculation of unassigned weights may proceed for unassigned weights in the set of weights. This automatic calculation may be evaluated in a method similar to method 400 described herein with respect to FIG. 4.

The method 500 then continues to operation 522 where the animation application displays an updated animation set, the updated animation set comprising a set of weights associated with the existing animation token, the set of weights comprising the unassigned weights and the assigned weight. As a further example, the animation application may display all weights, including assigned weights and automatically calculated/unassigned weights. There may be an indication of which weights in the set of weights are automatically calculated. For example, the automatically calculated/unassigned weights may have an indication such as, "AUTO" text adjacent to, or associated with, the automatically calculated weight, highlighting, bolding, italicizing, graying out, or any other visual indication that the weight 210 was automatically calculated, and not an assigned weight.

Method 500 may repeat operations 506-522 for different received new data. As an example, the repeated new data may be a new animation token to be added to the animation set, a new piece of content to be added to the set of content mapped to the existing animation token, a weight assignment for a specified weight of the set of weights corresponding to the set of content mapped to the existing animation token, or any other user input associated with the existing animation token or a new animation token in the animation set.

Figure 6:
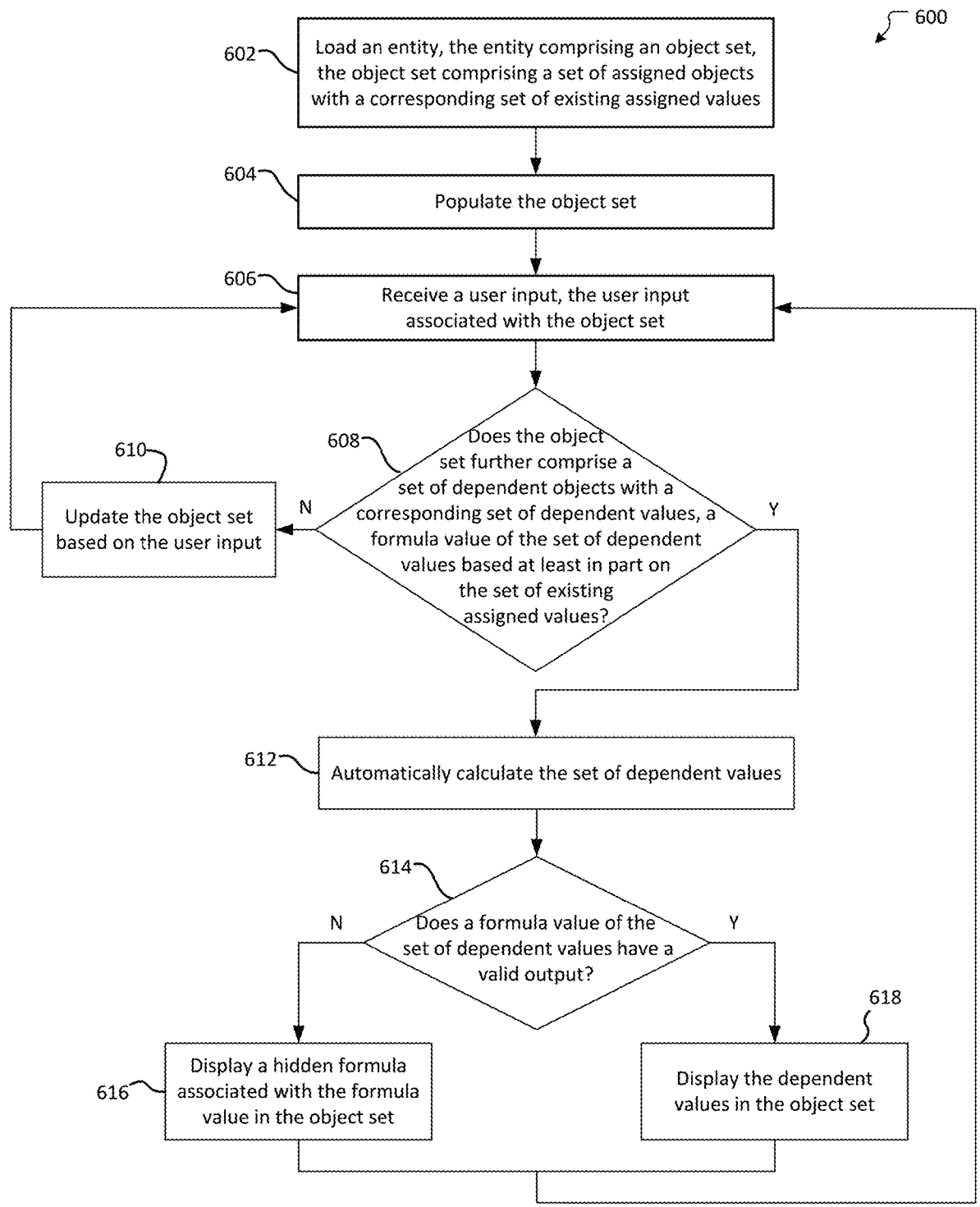
FIG. 6 illustrates a method of displaying hidden formulas associated with unassigned variables within an entity.

FIG. 6 illustrates a method of displaying hidden formulas associated with unassigned variables within an entity. Method 600 begins at operation 602 where an application (e.g., animation application 200 in FIG. 2, or spreadsheet application 800 in FIG. 8) loads an entity (e.g., entity 202 in FIG. 2, or entity 802 in FIG. 8) the entity comprising an object set (e.g., animation set 204C in FIG. 2, or object set 804 in FIG. 8), the object set comprising a set of assigned objects (e.g., "assigned weights" referred to in FIGS. 2-5, or set of assigned objects 806 in FIG. 8) with a corresponding set of existing assigned values. The object set may have one or more objects, and there may be one or more object sets.

The method 600 then continues to operation 604 where the application populates the object set. There may be a value or formula assigned to each object in the object set. The object values may be associated with each object. For example, if there are x objects in the object set, then there may be x object values. In the example of an animation set, this operation 604 may be the same or similar to operation 304 in FIG. 3. In a spreadsheet example, a cell in a spreadsheet may represent an object in a set of objects, and a value in a cell may be an object value associated with the object.

After populating the object set, method 600 continues to operation 606 where the application receives a user input associated with the object set. The user input may be a variety of inputs for a variety of applications. For example, the user input may be a new object in the set of objects (e.g., new animation token in an animation application or new cell in a spreadsheet application) or a new object value (e.g., a new piece of content to be added to an existing animation token or a weight assignment for existing content in an animation application, or a new cell value in a spreadsheet application).

At operation 608, the application determines if the object set further comprises a set of dependent objects with a corresponding set of dependent values, a formula value of the set of dependent values based at least in part on the set of existing assigned values. For example, for an animation application, operation 608 determines if the animation set (object set) further comprises a set of one or more unassigned weights (dependent objects), each of the unassigned weights (dependent objects) having a value (formula value) dependent upon the assigned weights or lack of assigned weights (existing assigned values) associated with the animation set (object set). As another example, for a spreadsheet application, operation 608 determines if the set of cells (object set) further comprises a set of one or more dependent cells (dependent objects) at least one of which has a value (formula value) that depends on or references a set of assigned cells (existing assigned objects).

If operation 608 evaluates to "No," then method 600 continues to operation 610 where the application updates the object set based on the user input. As an example, the operation 608 may evaluate to "No" if there are no dependent objects that need to be calculated based on the existing assigned objects. Method 600 may then repeat operations 606-608 where the application receives user input and determines if the object set further comprises a set of dependent values with a formula value of the dependent values based at least in part on the set of existing assigned values.

If operation 608 evaluates to "Yes," then method 600 continues directly to operation 612 where the application automatically calculates the set of dependent values. In an example regarding an animation application, operation 612 may be the same or similar to operation 320 in FIG. 3 and method 400 of FIG. 4 (e.g., evaluating a set of unassigned weights). In an example regarding a spreadsheet application, the dependent cell may be calculated with respect to an associated formula entered into the dependent cell. Additionally or alternatively, the dependent cell may be calculated based on a predicted formula of the cell, predicted based on pattern recognition, adjacent cells, precedent cells, or any other prediction of a formula associated with a cell.

At operation 614 the application determines if a formula value of the set of dependent values has a valid output. In an example referencing animation application 200, a valid unassigned and automatically calculated weight may be any weight between 0 and 100 (designating 0% to 100%). An invalid output may be a negative number or number greater than 100. Thus, an invalid output may arise when assigned weights, used to calculate the unassigned weights, sum to greater than 100 or assigned weights are negative. In an example referencing a spreadsheet application, a valid output may be any non-error value. An example of an invalid output may be an infinite number (or a number being calculated by dividing by zero). Another example of an invalid output may be a value calculated using cells that are not yet assigned a correct value type or any value at all. Other examples of invalid values include any other calculation errors or calculations made with incomplete information (e.g., one or more reference cells being left empty or any other input, or lack of input, in the reference cell that causes an error or blank/uncalculated value in a dependent cell referencing the reference cell(s)).

If operation 614 evaluates to "No," then method 600 proceeds to operation 616 where the application displays a hidden formula associated with the formula value in the object set. In an example using an animation application, a hidden formula may be a distribution or formula used to calculate the unassigned weight, or additionally or alternatively, an error message indicating that the unassigned weight is invalid may be displayed. In an example using a spreadsheet application, a hidden formula may be the formula entered into the dependent cell, or the predicted formula used to calculate the dependent cell. The displayed hidden formula may have indications such as, "AUTO" text, or "HIDDEN" text, or any other text, adjacent to, or associated with, the automatically calculated weight, highlighting, bolding, italicizing, graying out, or any other visual indication that the hidden formula is being automatically calculated based on existing assigned objects/reference cell(s).

If operation 614 evaluates to "Yes," the method 600 proceeds to operation 618 where the application displays the dependent values in the object set. For example, in the animation application, if the unassigned weight(s) calculate automatically to be a valid output (i.e., a value between 0-1), then the calculated weight(s) may be displayed in the animation set. As another example, in the spreadsheet application, if the dependent cell executes the formula and has a valid output, then that valid output may be displayed in the dependent cell. The valid formula value may have indications such as, "AUTO" text, or "HIDDEN" text, or any other text, adjacent to, or associated with, the automatically calculated weight, highlighting, bolding, italicizing, graying out, or any other visual indication that the formula value is being automatically calculated based on existing assigned objects/reference cell(s).

Method 600 may then repeat operations 606-618 for different received user inputs.

Figure 7:
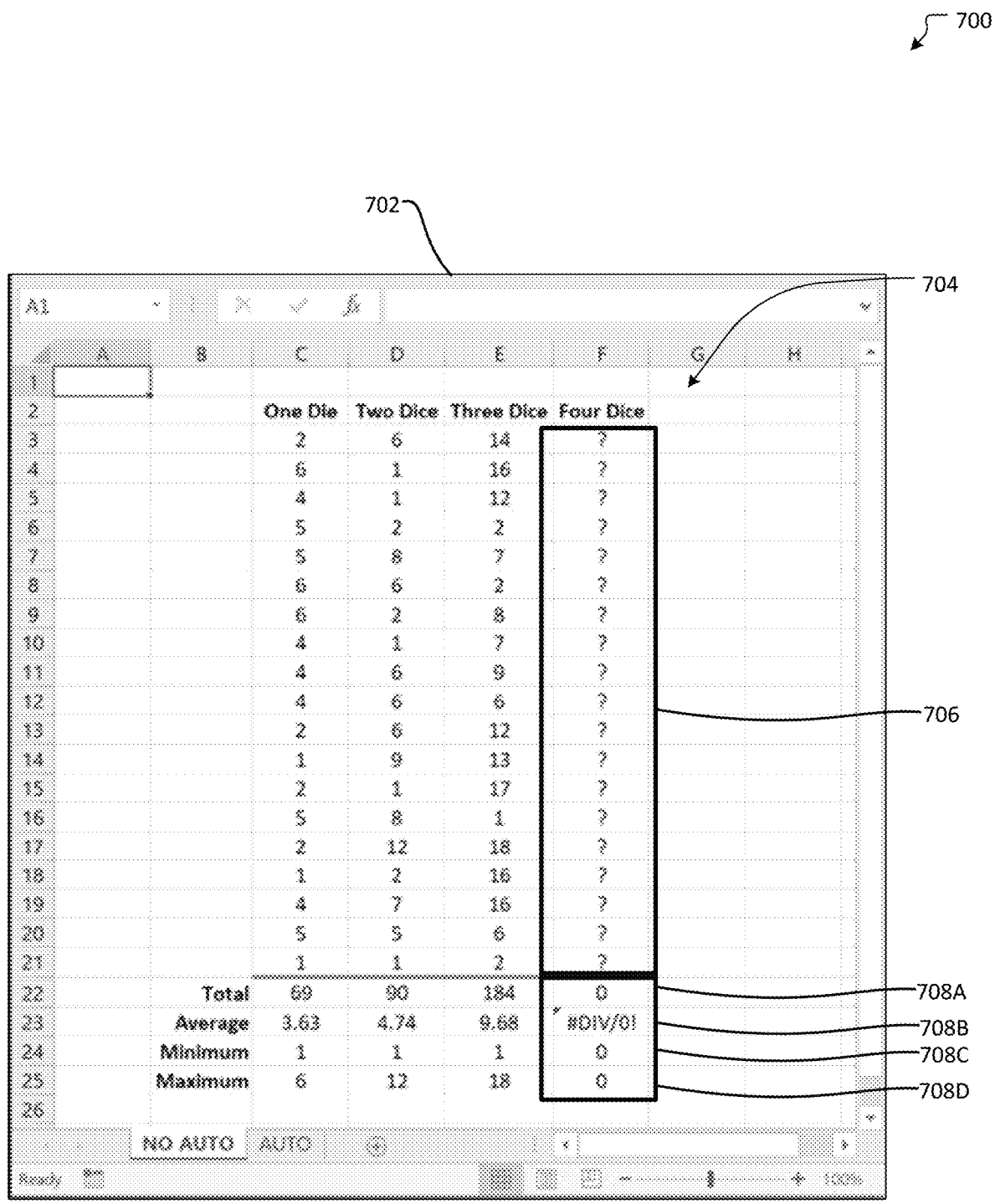
FIG. 7 illustrates a spreadsheet application with assigned objects and dependent objects as part of an object set for an entity, the dependent objects displaying invalid outputs.

FIG. 7 illustrates a spreadsheet application 700 with a set of assigned objects 706 and set of dependent objects 708 as part of an object set 704 for an entity 702, the set of dependent objects 708 displaying invalid outputs 701A-D. In this illustration, the object set 704 may be a set of cells in the spreadsheet application 700. The object set 704 may have at least two categories of cells: a set of assigned objects 706 and a set of dependent objects 708. The set of assigned objects 706 may have assigned values. The assigned values may be generated in a variety of ways, such as user-inputted values, formulas, or any other way to obtain a value in a cell in a spreadsheet application 700. The set of dependent objects 708 may have formulas that reference, or depend on, one or more assigned values of the set of assigned objects. In this example, a variety of formulas are used in the set of dependent cells, each referencing the set of assigned objects, including a total formula with total formula value 710A, an average formula with average formula value 710B, a minimum formula with minimum formula value 710C, and a maximum formula with maximum formula value 710D. It should be appreciated that, while specific formulas were used with respect to FIG. 7, any type of spreadsheet-calculable formula or other cell dependency may be used.

Values of the set of dependent objects 708 may be determined to be valid or invalid, as described above with respect to FIG. 6. In this illustration, the formula values 710A-D of the set of dependent objects are each invalid. As shown, average formula value 710B may be invalid due to a calculation error or due to non-entry of values upon which the average formula value 710B depends. The other depicted formula values (i.e., total formula value 710A, minimum formula value 710C, and maximum formula value 710D) may be invalid due to non-entry of values into the set of assigned objects 706 on which the formula values 710A, 710C, 710D depend.

Figure 8:
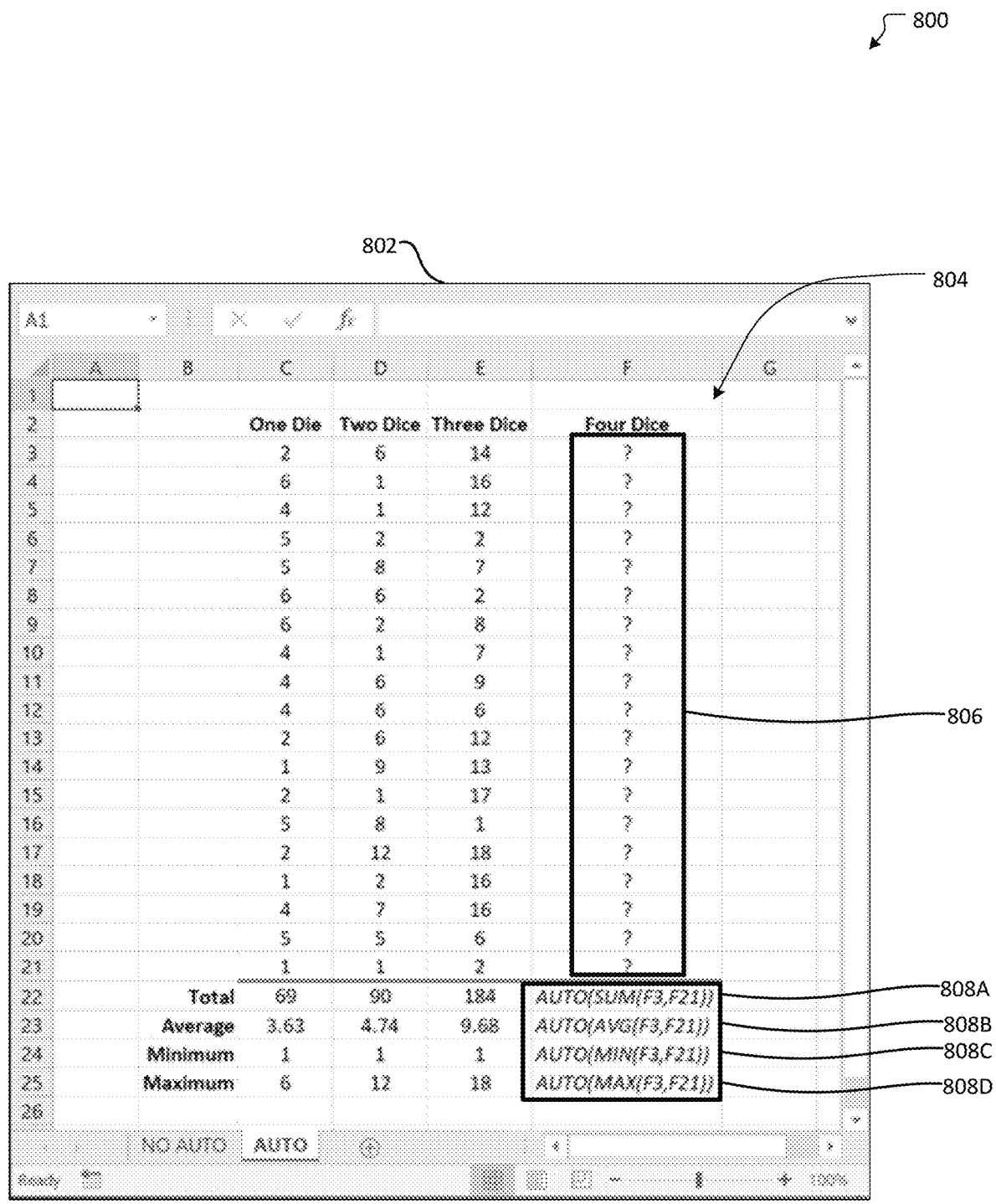
FIG. 8 illustrates a spreadsheet application with assigned objects and dependent objects as part of an object set for an entity, the dependent objects displaying a hidden formula.

FIG. 8 illustrates a spreadsheet application 800 with a set of assigned objects 806 and a set of dependent objects 808 as part of an object set 804 for an entity 802, the set of dependent objects 808 displaying hidden formulas 810A-D. In this illustration, the object set 804 may be a set of cells in the spreadsheet application 800. The object set 804 may have at least two categories of cells: a set of assigned objects 806 and a set of dependent objects 808. The set of assigned objects 806 may have assigned values. The assigned values may be generated in a variety of ways, such as user-inputted values, formulas, or any other way to obtain a value in a cell in a spreadsheet application 800. The set of dependent objects 808 may have formulas that reference, or depend on, one or more assigned values of the set of assigned objects. In this example, a variety of formulas are used in the set of dependent cells, each referencing the set of assigned objects, including a total formula 810A, an average formula 810B, a minimum formula 810C, and a maximum formula 810D. As an example, each of these formulas may have formula values (e.g., such as formula values 710A-D in FIG. 7). It should be appreciated that, while specific formulas were used with respect to FIG. 8, any type of spreadsheet-calculable formula or other cell dependency may be used.

Values of the set of dependent objects 808 may be determined to be valid or invalid, as described above with respect to FIG. 6. In this illustration, the underlying formula values (e.g., formula values 710A-D of FIG. 7) of the set of dependent objects 808 are each invalid, as described above with respect to FIG. 7. In this example, in addition to or in lieu of displaying the invalid formula values (e.g., formula values 710A-D), the spreadsheet application 800 may display the formulas 810A-D. The formulas 810A-D may have indications such as, "AUTO" text, or "HIDDEN" text, or any other text, adjacent to, or associated with, the automatically calculated weight, highlighting, bolding, italicizing, graying out, or any other visual indication that the formula 810A-D is being automatically calculated based on the set of assigned objects 806.

Figure 9:
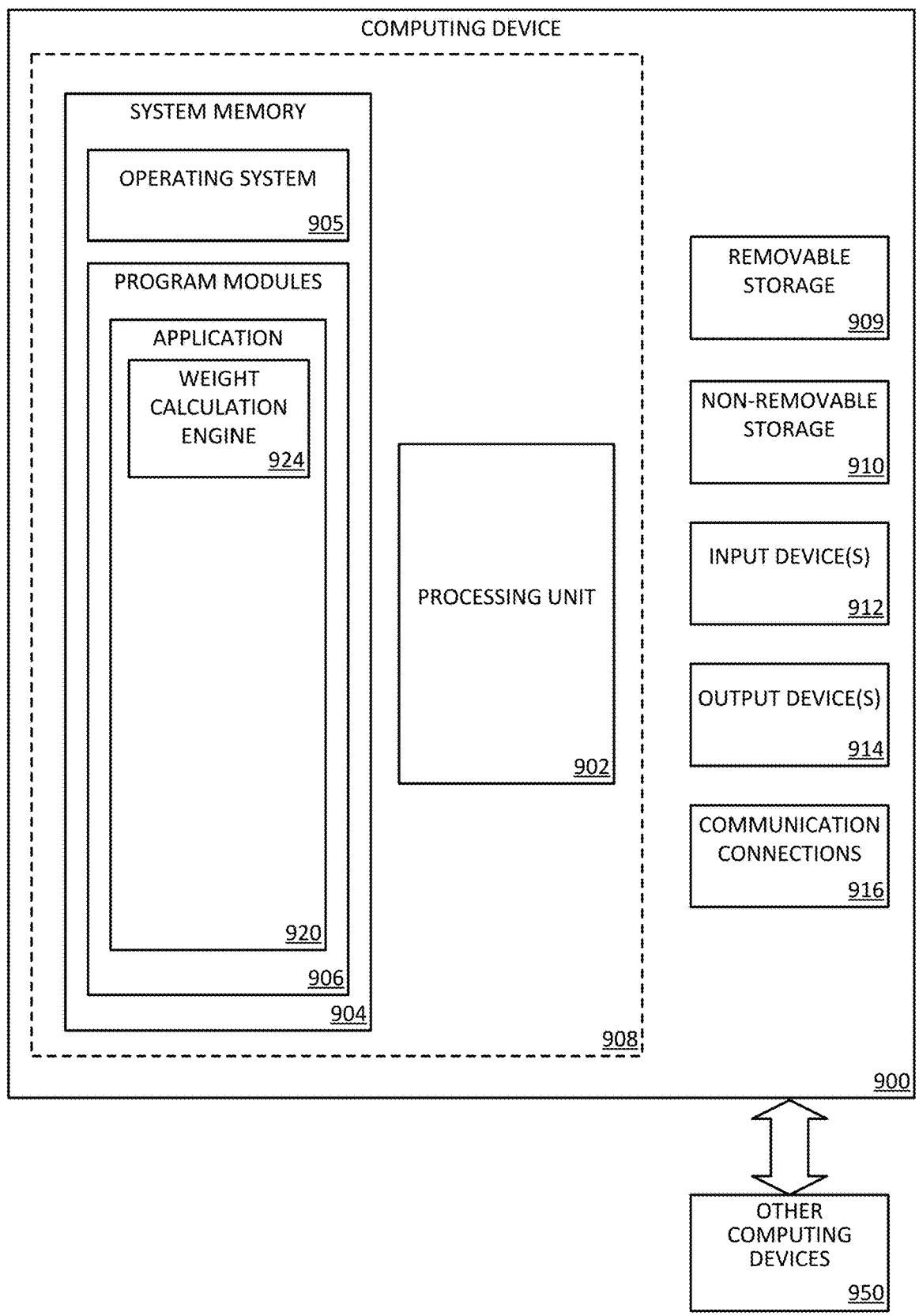
FIG. 9 illustrates a block diagram illustrating example physical components of a computing device with which aspects of the disclosure may be practiced.

FIG. 9 is a block diagram illustrating physical components (e.g., hardware) of a computing device 900 with which aspects of the disclosure may be practiced. The computing device components described below may be suitable for the computing devices described above, including the client devices 104A, 104B and the module server 110 in FIG. 1. In a basic configuration, the computing device 900 may include at least one processing unit 902 and a system memory 904. Depending on the configuration and type of computing device, the system memory 904 may comprise, but is not limited to, volatile storage (e.g., random access memory), non-volatile storage (e.g., read-only memory), flash memory, or any combination of such memories.

The system memory 904 may include an operating system 905 and one or more program modules 906 suitable for running software application 920, such as one or more components supported by the systems described herein. As examples, system memory 904 may store the weight calculation engine 924. The operating system 907, for example, may be suitable for controlling the operation of the computing device 900.

Furthermore, aspects of the disclosure may be practiced in conjunction with a graphics library, other operating systems, or any other application program and is not limited to any particular application or system. This basic configuration is illustrated in FIG. 9 by those components within a dashed line 908. The computing device 900 may have additional features or functionality. For example, the computing device 900 may also include additional data storage devices (removable and/or non-removable) such as, for example, magnetic disks, optical disks, or tape. Such additional storage is illustrated in FIG. 9 by a removable storage device 909 and a non-removable storage device 910.

As stated above, a number of program modules and data files may be stored in the system memory 904. While executing on the at least one processing unit 902, the program modules 906 (e.g., application 920) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, the disclosure may be practiced via a system-on-a-chip (SOC) where each or many of the components illustrated in FIG. 9 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 900 on the single integrated circuit (chip). Examples described in the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 900 may also have one or more input device(s) 912 such as a keyboard, a mouse, a pen, a sound or voice input device, a touch or swipe input device, etc. The output device(s) 914 such as a display, speakers, a printer, etc. may also be included. The aforementioned devices are examples and others may be used. The computing device 900 may include one or more communication connections 916 allowing communications with other computing devices 970. Examples of suitable communication connections 916 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. Any such computer storage media may be part of the computing device 900. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 10A:
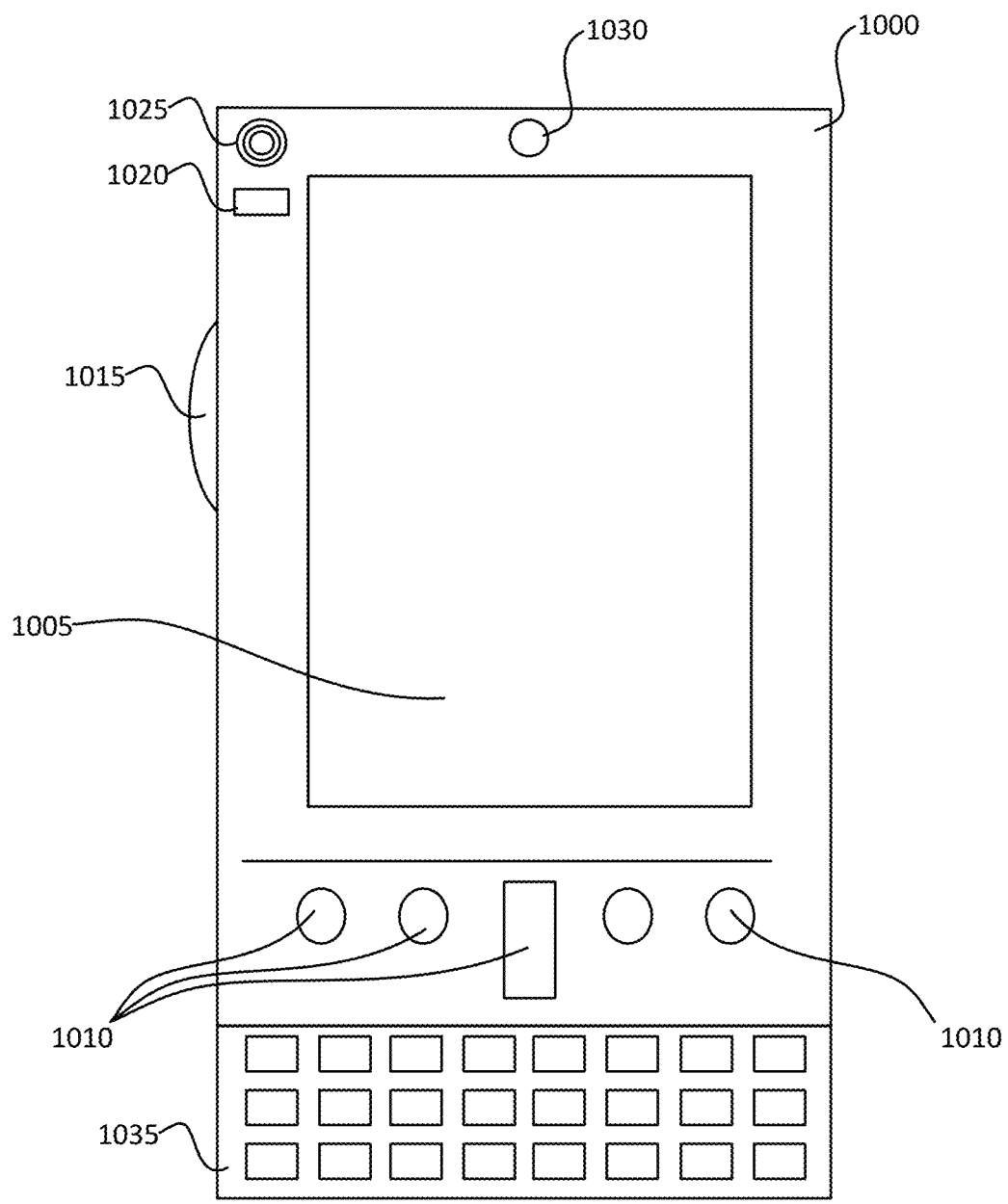
FIGS. 10A and 10B illustrate simplified block diagrams of a mobile computing device with which aspects of the present disclosure may be practiced.
Figure 10B:
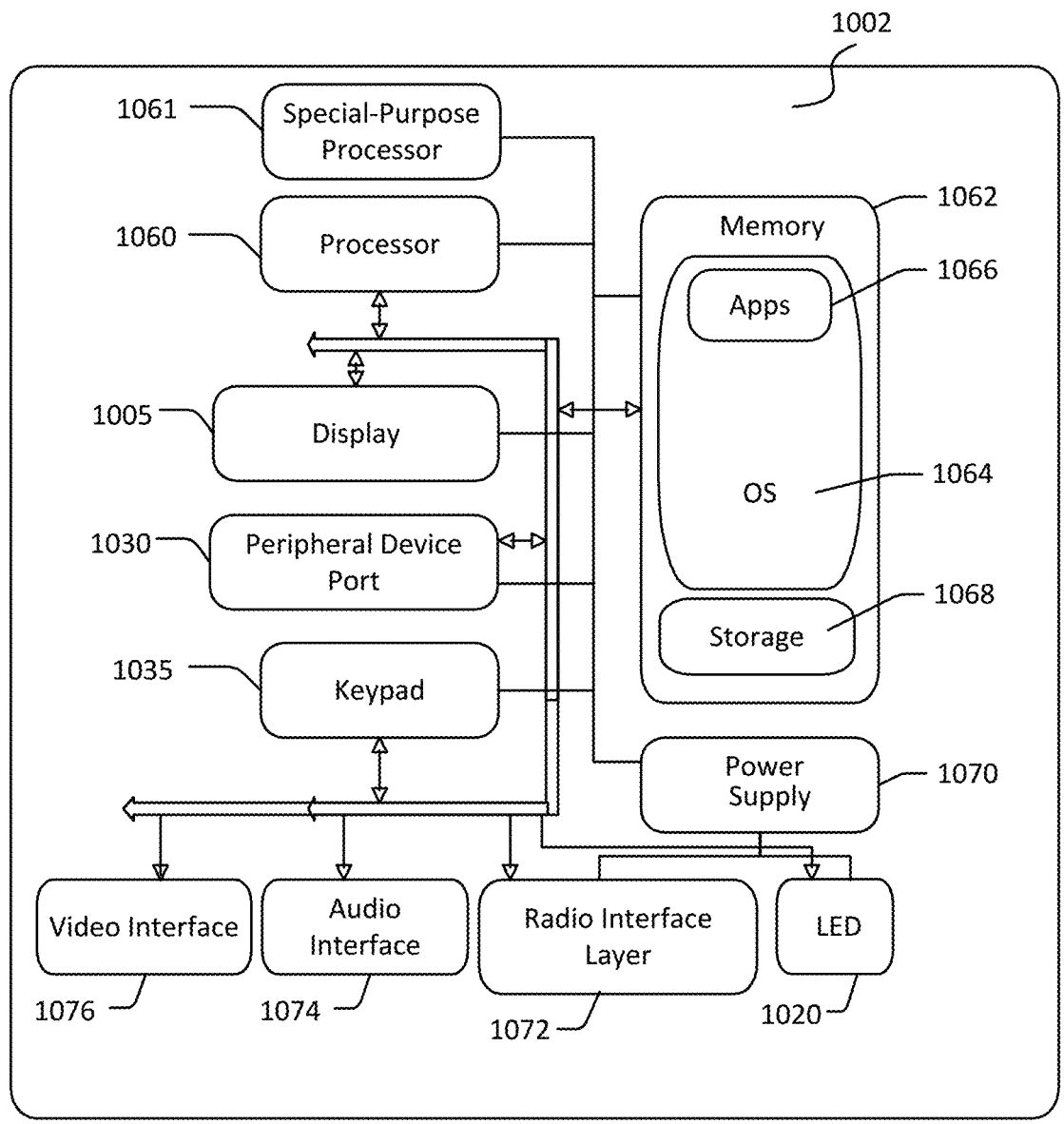

FIGS. 10A and 10B illustrate a mobile computing device 1000, for example, a mobile telephone, a smart phone, wearable computer (such as a smart watch), a tablet computer, a laptop computer, and the like, with which aspects of the disclosure may be practiced. In some aspects, the client may be a mobile computing device. With reference to FIG. 10A, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display).

An exemplary mobile computing device 1000 may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which examples of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

If included, an optional side input element 1015 allows further user input. The side input element 1015 may be a rotary switch, a button, or any other type of manual input element. In alternative aspects, mobile computing device 1000 may incorporate more or less input elements. For example, the display 1005 may not be a touch screen in some examples.

In yet another alternative example, the mobile computing device 1000 is a portable phone system, such as a cellular phone. The mobile computing device 1000 may also include an optional keypad 1035. Optional keypad 1035 may be a physical keypad or a "soft" keypad generated on the touch screen display.

In various examples, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one aspect of a mobile computing device. That is, the mobile computing device 1000 can incorporate a system (e.g., an architecture) 1002 to implement some aspects. In one example, the system 1002 is implemented as a "smart phone" capable of running one or more applications (e.g., browser, e-mail, calendaring, contact managers, messaging clients, games, and media clients/players). In some aspects, the system 1002 is integrated as a computing device, such as an integrated personal digital assistant (PDA) and wireless phone.

One or more application programs 1066 may be loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. The system 1002 also includes a non-volatile storage area 1068 within the memory 1062. The non-volatile storage area 1068 may be used to store persistent information that should not be lost if the system 1002 is powered down. The application programs 1066 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000 described herein (e.g., search engine, extractor module, relevancy ranking module, answer scoring module, etc.).

The system 1002 has a power supply 1070, which may be implemented as one or more batteries. The power supply 1070 might further include an external power source, such as an AC adapter or a powered docking cradle that supplements or recharges the batteries.

The system 1002 may also include a radio interface layer 1072 that performs the function of transmitting and receiving radio frequency communications. The radio interface layer 1072 facilitates wireless connectivity between the system 1002 and the "outside world," via a communications carrier or service provider. Transmissions to and from the radio interface layer 1072 are conducted under control of the operating system 1064. In other words, communications received by the radio interface layer 1072 may be disseminated to the application programs 1066 via the operating system 1064, and vice versa.

The visual indicator 1020 may be used to provide visual notifications, and/or an audio interface 1074 may be used for producing audible notifications via the audio transducer 1025. In the illustrated example, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. In accordance with aspects of the present disclosure, the microphone may also serve as an audio sensor to facilitate control of notifications, as will be described below. The system 1002 may further include a video interface 1076 that enables an operation of an on-board camera 1030 to record still images, video stream, and the like.

A mobile computing device 1000 implementing the system 1002 may have additional features or functionality. For example, the mobile computing device 1000 may also include additional data storage devices (removable and/or non-removable) such as, magnetic disks, optical disks, or tape. Such additional storage is illustrated in FIG. 10B by the non-volatile storage area 1068.

Data/information generated or captured by the mobile computing device 1000 and stored via the system 1002 may be stored locally on the mobile computing device 1000, as described above, or the data may be stored on any number of storage media that may be accessed by the device via the radio interface layer 1072 or via a wired connection between the mobile computing device 1000 and a separate computing device associated with the mobile computing device 1000, for example, a server computer in a distributed computing network, such as the Internet. As should be appreciated such data/information may be accessed via the mobile computing device 1000 via the radio interface layer 1072 or via a distributed computing network. Similarly, such data/information may be readily transferred between computing devices for storage and use according to well-known data/information transfer and storage means, including electronic mail and collaborative data/information sharing systems.

Figure 11:
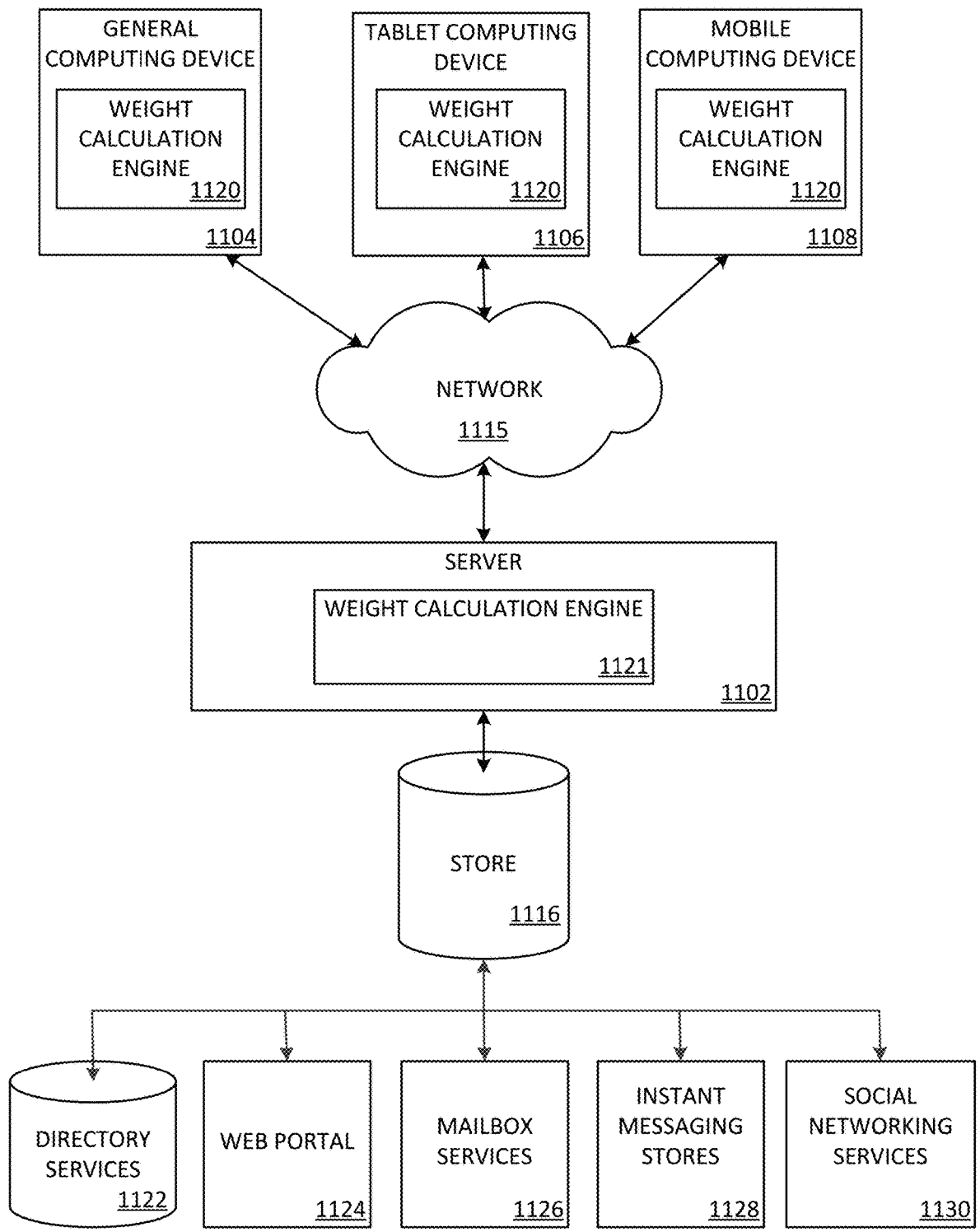
FIG. 11 illustrates a simplified block diagram of a distributed computing system in which aspects of the present disclosure may be practiced.

FIG. 11 illustrates one aspect of the architecture of a system for processing data received at a computing system from a remote source, such as a personal computer 1104, tablet computing device 1106, or mobile computing device 1108, as described above. Content displayed at server device 1102 may be stored in different communication channels or other storage types. For example, various documents may be stored using a directory service 1122, a web portal 1124, a mailbox service 1126, an instant messaging store 1128, or a social networking site 1130.

A weight calculation engine 1120 may be employed by a client that communicates with server device 1102, and/or the adaptive UI module engine 1121 may be employed by server device 1102. The server device 1102 may provide data to and from a client computing device such as a personal computer 1104, a tablet computing device 1106 and/or a mobile computing device 1108 (e.g., a smart phone) through a network 1115. By way of example, the computer system described above may be embodied in a personal computer 1104, a tablet computing device 1106 and/or a mobile computing device 1108 (e.g., a smart phone). Any of these aspects of the computing devices may obtain content from the store 1116, in addition to receiving graphical data useable to be either pre-processed at a graphic-originating system, or post-processed at a receiving computing system.

In accordance with some examples of the present disclosure, a system is provided. In one aspect, there is a system comprising a processor and memory storing computer-executable instructions. When the executable instructions are executed by the processor, they cause the processor to perform operations: loading an animation set comprising a set of existing content associated with an existing animation token; populating a set of weights associated with the existing animation token, the set of weights corresponding with the set of existing content; receiving a user input associated with the existing animation token; automatically calculating a set of unassigned weights of the set of weights; and displaying the set of weights associated with the set of content for the existing animation token, the set of unassigned weights of the set of weights further displaying an indication of automatic calculation.

As another example, the user input associated with the existing animation token is one or more of: new content associated with the existing animation token and a new assigned weight of the set of weights. As a further example, the operations may further comprise setting the new assigned weight before automatically calculating the set of unassigned weights. As yet another example, automatically calculating the set of unassigned weights of the set of weights comprises: determining a total quantity of content in the set of content; categorizing the total quantity of content into an assigned quantity and an unassigned quantity, the assigned quantity corresponding with a set of assigned weights; determining a percent available by subtracting a sum of the set of assigned weights from a threshold; and calculating the set of unassigned weights associated with the unassigned quantity, based on the percent available, the unassigned quantity, and a distribution. As yet a further example, the threshold is one hundred percent. In an example, the distribution is an equal distribution, such that the set of unassigned weights are equal. In another example, the set of content comprises an animation file. In a further example, the set of unassigned weights is one unassigned weight. In yet another example, the indication is a font change of the set of unassigned weights. In a further example, the indication is displaying AUTO text adjacent to the set of unassigned weights.

In accordance with some examples of the present disclosure, a method is provided. In one aspect, there is a method comprising: displaying an animation set for an entity, the animation set comprising a set of content associated with an existing animation token; displaying a control to adjust an animation feature, the animation feature associated with the animation set; receiving a user selection of the control; providing a user interface to receive new data; receiving the new data, the new data associated with the existing animation token; automatically calculating a set of unassigned weights associated with the existing animation token; and displaying an updated animation set, the updated animation set comprising a set of weights associated with the existing animation token, the set of weights comprising the set of unassigned weights and a set of assigned weights, wherein the unassigned weights further display an indication of automatic calculation.

In an example, the new data is one or more of: new content associated with the existing animation token and a new assigned weight of existing content of the existing animation token. In another example, the set of unassigned weights is one unassigned weight. In a further example, the set of assigned weights is the new assigned weight. In yet another example, automatically calculating the set of unassigned weights of the set of weights comprises: determining a total quantity of content in the set of content; categorizing the total quantity of content into an assigned quantity and an unassigned quantity, the assigned quantity corresponding with the set of assigned weights; determining a percent available by subtracting a sum of the set of assigned weights from one hundred percent; and calculating the set of unassigned weights associated with the unassigned quantity, based on the percent available, the unassigned quantity, and a distribution. In yet a further example, the distribution is an equal distribution, such that the set of unassigned weights are equal. In another example, the set of content comprises an animation file. In a further example, the indication is a font change of the unassigned weights. In yet another example, the indication is displaying AUTO text adjacent to the set of unassigned weights.

In accordance with some examples of the present disclosure, a method is provided. In one aspect, there is a method comprising: loading an entity, the entity comprising an object set, the object set comprising a set of assigned objects with a corresponding set of existing assigned values and a set of dependent objects with a corresponding set of dependent values, the set of dependent values comprising a formula value based at least in part on the set of existing assigned values; populating the object set; receiving a user input, the user input associated with the object set; automatically calculating the set of dependent values; and upon determining that the formula value is invalid, displaying a hidden formula associated with the formula value in the object set and an indication that the hidden formula is hidden.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
    a processor; and
    memory storing computer-executable instructions that, when executed by the processor, cause the processor to perform operations:
        loading an animation set comprising a set of existing content associated with an existing animation token;
        populating a set of weights associated with the existing animation token, the set of weights corresponding with the set of existing content;
        receiving a user input associated with the existing animation token;
        automatically calculating a set of unassigned weights of the set of weights; and
        displaying the set of weights associated with the set of content for the existing animation token, wherein displaying the set of weights comprises displaying at least one unassigned weight from the set of unassigned weights of the set of weights associated with an indication that the at least one unassigned weight was automatically determined, wherein the indication distinguishes the at least one unassigned weight from assigned weights.

2. The system of claim 1, wherein the user input associated with the existing animation token is one or more of: new content associated with the existing animation token and a new assigned weight of the set of weights.

3. The system of claim 2, the operations further comprising:
    setting the new assigned weight before automatically calculating the set of unassigned weights.

4. The system of claim 1, wherein automatically calculating the set of unassigned weights of the set of weights comprises:
    determining a total quantity of content in the set of content;
    categorizing the total quantity of content into an assigned quantity and an unassigned quantity, the assigned quantity corresponding with a set of assigned weights;
    determining a percent available by subtracting a sum of the set of assigned weights from a threshold; and
    calculating the set of unassigned weights associated with the unassigned quantity, based on the percent available, the unassigned quantity, and a distribution.

5. The system of claim 4, wherein the threshold is one hundred percent.

6. The system of claim 4, wherein the distribution is an equal distribution, such that the set of unassigned weights are equal.

7. The system of claim 1, wherein the set of content comprises an animation file.

8. The system of claim 1, wherein the set of unassigned weights is one unassigned weight.

9. The system of claim 1, wherein the indication is a font change of the set of unassigned weights.

10. The system of claim 1, wherein the indication is displaying AUTO text adjacent to the set of unassigned weights.

11. A method comprising:
    displaying an animation set for an entity, the animation set comprising a set of content associated with an existing animation token;
    displaying a control to adjust an animation feature, the animation feature associated with the animation set;
    receiving a user selection of the control;
    providing a user interface to receive new data;
    receiving the new data, the new data associated with the existing animation token;
    automatically calculating a set of unassigned weights associated with the existing animation token; and
    displaying an updated animation set, the updated animation set comprising a set of weights associated with the existing animation token, the set of weights comprising the set of unassigned weights and a set of assigned weights, wherein the unassigned weights further display an indication of automatic calculation.

12. The method of claim 11, wherein the new data is one or more of: new content associated with the existing animation token and a new assigned weight of existing content of the existing animation token.

13. The method of claim 12, wherein the set of unassigned weights is one unassigned weight.

14. The system of claim 12, wherein the set of assigned weights is the new assigned weight.

15. The method of claim 11, wherein automatically calculating the set of unassigned weights of the set of weights comprises:
    determining a total quantity of content in the set of content;
    categorizing the total quantity of content into an assigned quantity and an unassigned quantity, the assigned quantity corresponding with the set of assigned weights;
    determining a percent available by subtracting a sum of the set of assigned weights from one hundred percent; and
    calculating the set of unassigned weights associated with the unassigned quantity, based on the percent available, the unassigned quantity, and a distribution.

16. The method of claim 15, wherein the distribution is an equal distribution, such that the set of unassigned weights are equal.

17. The method of claim 11, wherein the set of content comprises an animation file.

18. The system of claim 11, wherein the indication is a font change of the unassigned weights.

19. The system of claim 11, wherein the indication is displaying AUTO text adjacent to the set of unassigned weights.

20. A method comprising:
loading an entity, the entity comprising an object set, the object set comprising a set of assigned objects with a corresponding set of existing assigned values and a set of dependent objects with a corresponding set of dependent values, the set of dependent values comprising a formula value based at least in part on the set of existing assigned values;
populating the object set;
receiving a user input, the user input associated with the object set;
automatically calculating the set of dependent values; and
upon determining that the formula value is invalid, displaying a hidden formula associated with the formula value in the object set and an indication that the hidden formula is hidden.

* * * * *